United States Patent
Heber et al.

(10) Patent No.: US 10,569,831 B2
(45) Date of Patent: Feb. 25, 2020

(54) MEANS OF TRANSPORTATION AND METHOD FOR OPERATING A MEANS OF TRANSPORTATION

(71) Applicant: Brake Force One GmbH, Tuebingen (DE)

(72) Inventors: Lars Heber, Dorsten (DE); Stephan Stabrey, Stuttgart (DE)

(73) Assignee: Brake Force One GmbH, Tuebingen (DE)

( * ) Notice: Subject to any disclaimer, the term of this patent is extended or adjusted under 35 U.S.C. 154(b) by 261 days.

(21) Appl. No.: 15/102,767

(22) PCT Filed: Nov. 19, 2014

(86) PCT No.: PCT/EP2014/075026
§ 371 (c)(1),
(2) Date: Jun. 8, 2016

(87) PCT Pub. No.: WO2015/086274
PCT Pub. Date: Jun. 18, 2015

(65) Prior Publication Data
US 2016/0318578 A1 Nov. 3, 2016

(30) Foreign Application Priority Data
Dec. 10, 2013 (DE) .......................... 10 2013 225 481

(51) Int. Cl.
*B62M 6/50* (2010.01)
*B62L 1/02* (2006.01)
(Continued)

(52) U.S. Cl.
CPC ............... *B62M 6/50* (2013.01); *B62K 3/002* (2013.01); *B62L 1/02* (2013.01); *B62L 3/02* (2013.01);
(Continued)

(58) Field of Classification Search
None
See application file for complete search history.

(56) References Cited

U.S. PATENT DOCUMENTS 4,151,892 A 5/1979 Francken
5,226,501 A * 7/1993 Takata ............... B60L 15/2063
180/19.1
(Continued)

FOREIGN PATENT DOCUMENTS

CN 202105404 1/2012
CN 202802711 3/2013
(Continued)

OTHER PUBLICATIONS

International Search Report dated Feb. 20, 2015, of the corresponding International Application PCT/EP2014/075026 filed on Nov. 19, 2014.

*Primary Examiner* — Kevin P Mahne
(74) *Attorney, Agent, or Firm* — Norton Rose Fulbright US LLP

(57) ABSTRACT

A transportation device, in particular a foot scooter, for the locomotion of a person, the transportation device including a footboard having a deck for accommodating the person, the transportation device being propellable by a push-off by the person, the transportation device including a motor for supporting the propulsion of the transportation device, the transportation device including a detection device for detecting a push-off state and a control device for controlling the support of the propulsion as a function of the detected push-off state, the detection device including a sensing device (10) for detecting a force exerted by a person on the deck.

10 Claims, 2 Drawing Sheets

(51) Int. Cl.
*B62L 3/02* (2006.01)
*B62K 3/00* (2006.01)
*B62J 99/00* (2020.01)

(52) U.S. Cl.
CPC ..... *B62J 2099/002* (2013.01); *B62K 2202/00* (2013.01); *B62K 2207/00* (2013.01)

(56) References Cited

U.S. PATENT DOCUMENTS

| | | | | |
|---|---|---|---|---|
| 5,487,441 | A | * | 1/1996 | Endo .................... A63C 17/004 180/181 |
| 5,819,868 | A | * | 10/1998 | Koike ...................... B60L 3/00 180/220 |
| 5,848,660 | A | * | 12/1998 | McGreen ............... B62K 3/002 180/220 |
| 5,857,537 | A | * | 1/1999 | Matsumoto ............. B62M 6/60 180/206.5 |
| 6,050,357 | A | * | 4/2000 | Staelin ................ A63C 17/004 180/65.1 |
| 2002/0063006 | A1 | | 5/2002 | Kamen et al. |
| 2002/0117341 | A1 | * | 8/2002 | Lan ........................ B62K 3/002 180/181 |
| 2004/0069543 | A1 | | 4/2004 | Kamen |
| 2006/0061312 | A1 | * | 3/2006 | Negoro .............. A63C 17/0046 318/432 |
| 2006/0213711 | A1 | * | 9/2006 | Hara .................. A63C 17/0033 180/181 |
| 2013/0081891 | A1 | * | 4/2013 | Ulmen ................... A63C 17/12 180/181 |
| 2013/0206493 | A1 | * | 8/2013 | Larson .................. A63C 17/12 180/181 |
| 2014/0196968 | A1 | * | 7/2014 | Bieler ..................... B62M 6/65 180/181 |
| 2016/0311322 | A1 | * | 10/2016 | Lagant .................... B62M 6/45 |
| 2017/0057596 | A1 | * | 3/2017 | Ichida ................... B62K 25/00 |

FOREIGN PATENT DOCUMENTS

| | | |
|---|---|---|
| DE | 200 13 449 U1 | 3/2001 |
| DE | 10 2010 010 172 A1 | 9/2011 |
| DE | 10 2011 082 088 A1 | 3/2013 |
| DE | 102011084754 | 4/2013 |
| DE | 10 2012 204 913 A1 | 10/2013 |
| WO | 98/46474 A2 | 10/1998 |
| WO | WO 98/46474 | 10/1998 |

* cited by examiner

MEANS OF TRANSPORTATION AND METHOD FOR OPERATING A MEANS OF TRANSPORTATION

FIELD

The present invention is directed to a transportation device and to a method for operating a transportation device.

BACKGROUND INFORMATION

An electric motor-assisted foot scooter which is intuitively propellable using muscle power is described in German Patent Application No. DE 10 2011 084 754 A1. From a resting position, or in a riding situation based on a visual push-off process, the foot scooter is caused to carry out a rolling motion or maintained in the rolling motion, the end of the push-off process is sensed based on an electronic control unit in conjunction with a sensor unit, and occurring riding resistances are automatically reduced based on a resistance model integrated into the control unit.

The end of the push-off process is ascertained with the aid of an analysis of the path trajectory. The push-off process is ascertained by a change of sign of the acceleration. The acceleration may be derived from the path or from the speed signal. For this purpose, appropriate sensors, such as speed sensors or Hall sensors, are provided. To prevent a mistake, for example due to rolling on a slope, the duration, the intensity, and the path length of the push-off process are also ascertained.

SUMMARY

The transportation device according to the present invention may have the advantage over the related art in that a push-off process may be detected particularly reliably. Compared to the conventional detection of the push-off process based on the speed or the acceleration, the transportation device according to the present invention is particularly robust with respect to other factors which may also cause a change in the speed.

This is achieved by a transportation device, in particular a foot scooter, for the locomotion of a person, the transportation device including a footboard having a deck for accommodating the person, the transportation device being propellable by a push-off by the person, the transportation device including a motor for supporting the propulsion of the transportation device, the transportation device including a detection device for detecting a push-off state and a control device for controlling the support of the propulsion as a function of the detected push-off state, and the detection device including a sensing device for detecting a force exerted by the person on the deck.

By detecting the force exerted by the person on the deck, it is prevented that it is erroneously inferred that a push-off process is present, for example during a motion of the transportation device down a ramp, due to a similar increase in speed as during a push-off process.

The detection of the push-off state based on the force exerted by the person on the deck also prevents that a push-off is erroneously inferred from speed changes which may occur when the person, for example, moves a leg without there being any ground contact.

Jerky weight shifts of the person may also cause similar accelerations as during a push-off. Such misdetections may be prevented according to the present invention.

A further advantage of the transportation device according to the present invention is that a misdetection of a push-off is avoided, which may occur, for example, when the push-off state is determined based on the motor speed instead of based on the force exerted by the person on the deck. In this case, elasticities in the drive system may cause a misdetection of a push-off. For example, if the drive torque of the motor is increased in a belt-driven scooter, its rotational speed may rise briefly due to the belt elasticity without the scooter actually accelerating and a push-off process being present.

It is particularly advantageous if the deck is a seating surface and/or a standing surface. In this case, it is particularly easy to attach the sensing device for detecting the force exerted by the person on the deck.

In one particularly preferred specific embodiment, the sensing device is a pressure sensor. In this way, the force exerted by the person on the deck may be detected particularly precisely and reliably.

In one alternative particularly preferred specific embodiment, the transportation device includes a sprung axle, and the sensing device includes device for determining the compression travel of the at least one sprung axle. In this way, a particularly robust option for detecting the force exerted by the person on the deck is implemented.

It is particularly preferred if the motor is an electric motor. Due to the increasing electrification of transportation devices, the transportation device according to the present invention may thus be made available to a growing market. With an electric motor, it is also advantageously achieved that the maximum torque for supporting the propulsion of the transportation device is present promptly when required. It is thus possible to control the support of the propulsion without a delay in the propulsion.

The example method for operating a transportation device may also have the above-mentioned advantages. This is achieved by a method for operating a transportation device, in particular a foot scooter, for the locomotion of a person, the transportation device including a deck for accommodating the person, the transportation device being propellable by a push-off by the person, a force exerted by the person on the deck being detected, and a motor present on the transportation device for supporting the propulsion of the transportation device being controlled as a function of the detected force.

In one particularly preferred specific embodiment of the method according to the present invention, an operation of the motor during time periods in which no push-off is present is carried out in such a way that a slowdown of the transportation device is reduced after a push-off by the person. In this way, the rolling resistance or an uphill grade of an ascent to be overcome is reduced in a manner perceptible to the person.

It is particularly preferred if an operation of the motor during time periods in which no push-off is present is carried out in such a way that a fluctuation in the speed induced by the push-off by the person is compensated for. In this way, a particularly low-jerk and even motion is possible.

It is furthermore particularly preferred when the mass of the person is inferred from the force detected at a point in time at which no push-off is present, and the motor is controlled as a function of the mass of the person. In this way, for example in the case of a particularly heavy rider, greater support may be provided by the motor due to higher friction and uphill grade resistances.

BRIEF DESCRIPTION OF THE DRAWINGS

Exemplary embodiments of the present invention are shown in the figures and are described in greater detail hereafter.

DETAILED DESCRIPTION OF EXAMPLE EMBODIMENTS

The transportation device 1 according to the present invention may, in principle, be any arbitrary transportation device 1 which is propelled by a push-off by a person. It may be, for example, a transportation device 1 having wheels 2, 3, such as a walker, or a transportation device having runners, such as a sled.

A push-off shall be understood to mean a push-off or a pressing off, for example using a hand or a foot of the person, with the aid of muscle power, on a surface. The surface may be the surface on which the locomotion of the transportation device 1 is taking place. However, it is also possible that the push-off takes place on a surface such as a pedal. Transportation device 1 according to the present invention may thus also be a bicycle, for example. It is also possible that the push-off takes place, for example, on a water surface or in the water, so that pedal and row boats, for example, are also covered by the transportation device 1 according to the present invention.

The present invention is described hereafter by way of example based on a foot scooter 1 as the transportation device 1 according to the present invention. Such foot scooters 1 are known under the term Kickboard or kick scooters, for example. This may also be, for example, a folding foot scooter 1.

Figure 1:
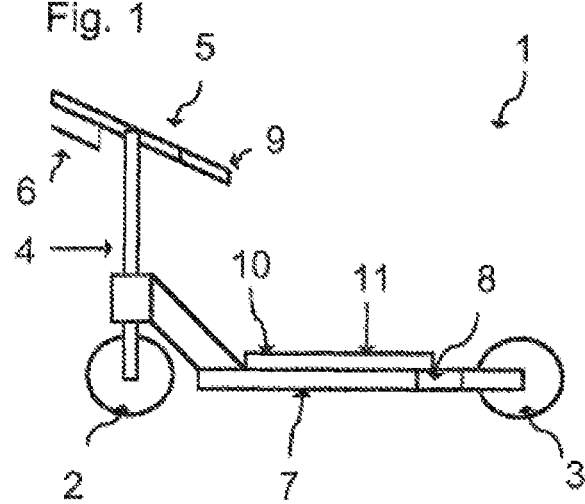
FIG. 1 shows a view of one embodiment of the transportation device according to the present invention as a foot scooter.

Such a foot scooter 1 is shown in FIG. 1. Foot scooter 1 includes two wheels 2, 3, front wheel 2 being rotatably connected to a steering rod 4. A handle bar 5, to which a manual braking device 6 is attached which acts on rear wheel 3 upon actuation, is located on steering rod 4. A standing surface 11 in the form of a deck 7 is situated between two wheels 2, 3. This deck is used to accommodate the person or, in this case, to accommodate the rider of foot scooter 1.

In general, a footboard 7 within the meaning of the present invention shall be understood such that the person need not be completely surrounded by footboard 7. In particular, footboard 7 may be a seating surface 11 or a standing surface 11. Footboard 7 allows the person to be present in or on footboard 7, without making contact with the surface on which the locomotion of the transportation device 1 is taking place.

In the exemplary embodiment of a foot scooter 1 shown in FIG. 1, the rider steps on deck 7 and with one leg pushes off a road or another type of ground on which foot scooter 1 is moving, in order to cause foot scooter 1 to carry out a motion or in order to maintain the motion of foot scooter 1.

Foot scooter 1 includes a motor 8, which in this exemplary embodiment is an electric motor 8 which is situated on or adjoining deck 7. However, other types of motors 8 are also possible, such as an internal combustion engine, for example. Electric motor 8 is used to support the propulsion of foot scooter 1 by the push-off by the rider. The power of this additional electric propulsion is controlled by the rider via a rotatable grip 9 which is attached to handle bar 5.

In this exemplary embodiment, a pressure-sensitive deck covering 10 in the form of a pressure sensor 10 is attached to deck 7. Pressure sensor 10 is used to calculate the force exerted by the rider on deck 7.

In one particularly preferred specific embodiment, the force which the person exerts on a deck 11 of footboard 7 should be understood to mean the magnitude of a force. In particular, it may involve the magnitude of the weight force. However, specific embodiments in which it is possible to detect the force as a vectorial quantity using a special sensor system are also possible.

However, other types of force detection exerted by the person on deck 11 are also possible. For example, foot scooter 1 shown in FIG. 1 may be configured with at least one sprung axle, the spring yielding in keeping with the force bearing on deck 7. In this case, the force exerted by the rider on deck 7 may be determined by a measurement of the compression travel.

Alternatively, for example, a force sensor may be used to detect the force which is exerted by the person on deck 11.

If the rider of foot scooter 1 shown in FIG. 1 now pushes off the road or another type of ground on which foot scooter 1 is moving in order to cause foot scooter 1 to carry out a motion or in order to maintain the motion of foot scooter 1, an acceleration of foot scooter 1 briefly takes place. During push-off, the rider sets one foot down on the road and transmits an additional pulse onto foot scooter 1 by pushing off or pressing off the ground with the foot.

After the rider has ended the push-off, in the case of a conventional foot scooter the speed of the foot scooter decreases again due to the riding resistances (air drag, rolling friction) when moving in a plane having no uphill grade.

A motor, which supplies a constant torque to support the propulsion, is not able to prevent these fluctuations in the speed. However, systems are possible in which the support is controlled as a function of the measured motor speed and/or a measured acceleration signal to compensate for the fluctuations. As described above, it is important that it is correctly identified whether or not a push-off process is actually present.

The present invention is based on the finding that, for the purpose of pushing off, a vertical force, i.e., a force perpendicular to the plane in which the locomotion of foot scooter 1 is taking place, acts on the pushing-off foot to transmit an accelerating longitudinal force, i.e., a force in the riding direction of foot scooter 1. The force acting on deck 7, which in this case is the weight force of the rider, is reduced during the push-off process by the magnitude of this vertical force.

If the force acting on deck 7 during the locomotion of foot scooter 1 is measured, it is thus possible to identify based on curve 12 of this force whether or not a push-off process is present.

Figure 2:
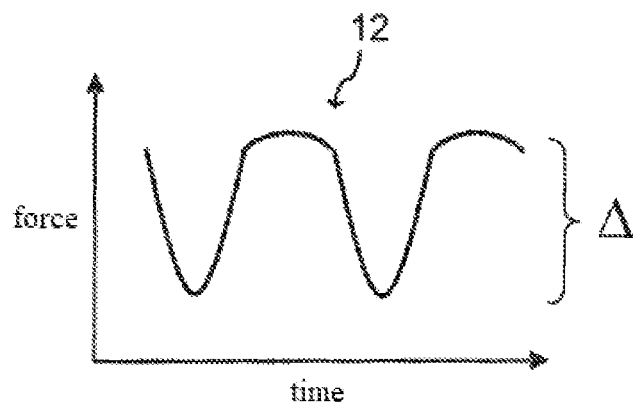
FIG. 2 shows an exemplary curve of a detected force exerted by the person on the deck as a function of time.

A typical curve 12 of the force which the person exerts on the deck as a function of time is shown in FIG. 2. During the push-off, the force on the deck decreases, reaches a minimum at the point in time of maximum force transmission on the road or other type of ground on which foot scooter 1 is moving, and subsequently increases again.

While the rider remains on deck 7 without starting another push-off, the detected force remains approximately constant. The force decreases again at the start of the next push-off.

Measurements have shown that during a push-off, for example, a deviation Δ of approximately 20% exists between the maximum detected force value and the minimum detected force value, the exact value being dependent on the overall system used, composed of foot scooter 1 and rider, and the acceleration behavior of the rider.

Thus, this represents a significant difference and allows a push-off to be distinguished from other effects which, as mentioned above, may result in a misidentification of a push-off in the conventional systems from the related art.

Figure 3:
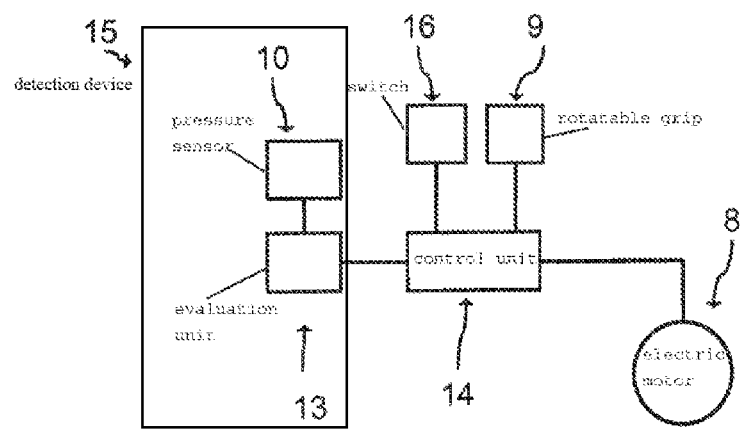
FIG. 3 shows an exemplary interconnection of components for operating the foot scooter shown in FIG. 1.

FIG. 3 shows an interconnection of components for operating foot scooter 1 of FIG. 1 as one exemplary embodiment of a transportation device 1 according to the present invention. Based on this representation, one exemplary embodiment for the method according to the present invention for operating a transportation device 1 is also provided hereafter.

Pressure sensor 10 detects the force which is instantaneously exerted by the rider on deck 7. This quantity is forwarded to an evaluation unit 13, in which, for example, typical curves 12 of the force as a function of time when a push-off is present are stored. It is also possible for typical curves 12 to be stored which indicate that explicitly no push-off is present.

By comparing the stored curves 12 to the instantaneously measured curve 12, evaluation unit 13 is able to determine a push-off state.

According to the present invention, the push-off state, for example, may either have the value that a push-off is present at that moment, i.e., the person is in the process of pushing off, or have the value that no push-off is present at that moment, i.e., that the person is not in the process of pushing off.

In this case, for example when a push-off is present, a signal to shut off the torque may be forwarded to a control unit 14, which controls the torque generated by electric motor 8. When the detected push-off state switches to the value that no push-off is present, the torque may be activated again.

Alternatively, it may be stored in evaluation unit 13 which torque change is typically required to mitigate the reduction in the speed which, as described above, occurs after the push-off due to riding resistances. As soon as the detected push-off state switches from a push-off to the value that no push-off is present, the evaluation unit forwards these stored values for the required change in the torque to control unit 14.

In another specific embodiment, it is also possible to determine the frequency of the push-offs in evaluation unit 13 and to calculate therefrom which change in torque is presumably required to compensate, between the push-offs, for the above-mentioned fluctuation in the speed induced by the push-off.

In one further alternative specific embodiment, foot scooter 1 includes a device for measuring a speed. The measured speed value is forwarded to control unit 14. There, a deviation of the speed value from a setpoint speed value is ascertained. As soon as the detected push-off state switches from a push-off to the value that no push-off is present, control unit 14 may regulate the torque in such a way that the detected deviation of the speed from the setpoint speed is mitigated or compensated for.

In another specific embodiment, the push-off state may either assume a value which signals that no push-off is present, or multiple intermediate values during the push-off, which provide information about how great the instantaneous acceleration due to the push-off is. It is particularly preferred if, as described above, foot scooter 1 includes a device for measuring a speed. The instantaneous acceleration induced by a push-off may be inferred from a combination of the measured speed signal and the ascertained force signal.

In this case, evaluation unit 13 may even forward the instantaneously required value of the torque change to control unit 14, which is needed to compensate for the changes in the speed which occur between the beginning and the end of a push-off.

In the exemplary embodiment shown in FIG. 3, pressure sensor 8 and evaluation unit 13 thus represent a detection device 15 for detecting a push-off state within the meaning of the present invention.

Control unit 14 for controlling the torque of motor 8 is furthermore connected to a switch 16 (not shown in FIG. 1) in this exemplary embodiment, via which the rider of the foot scooter may activate or deactivate the implementation of the signals received from evaluation unit 13.

In this exemplary embodiment, control unit 14 for controlling the torque of motor 8 is also connected to rotatable grip 9 which is attached to handle bar 5. Via the setting on rotatable grip 9 carried out by the rider, the torque may be regulated independently of the control as a function of the detected push-off state.

The intensity of the reaction to a change carried out on rotatable grip 9 may be adapted to the mass of the rider, for example. The mass of the rider may be determined from the force detected at a point in time at which no push-off is present.

In one alternative specific embodiment, foot scooter 1 has no rotatable grip 9 or a comparable device for the rider to regulate the torque provided by motor 8.

A specific embodiment having no means for the rider to regulate the torque provided by motor 8 has the advantage that, while according to the present invention it is possible to support the propulsion, which due to a control based on the push-off state is particularly comfortable for the rider, it may still be permitted to ride foot scooter 1 on a sidewalk, for example, depending on applicable traffic regulations, since no propulsion control independent of the push-off is provided.

In this case, the above-described determination of the mass of the rider of foot scooter 1 is particularly useful. In addition to the control as a function of the push-off state, the control of motor 8 may also take place as a function of the detected mass of the rider.

What is claimed is:

1. A foot scooter for the locomotion of a person, comprising:
    a footboard having a deck for accommodating the person, the foot scooter configured to be propellable by a pushing off motion by the person;
    a motor configured to support propulsion of the foot scooter;
    a detector including a sensor configured to measure a force resulting from the pushing off motion of the person on the deck;
    an evaluator configured to determine, based on the sensor measurement, whether a push-off state is present, and
    a controller configured to control the support of the propulsion as a function of the determined push-off state.

2. The foot scooter as recited in claim 1, wherein the deck is at least one of: i) a seating surface, and ii) a standing surface.

3. The foot scooter as recited in claim 1, where the sensor is a pressure sensor.

4. The foot scooter as recited in claim 1, further comprising:
at least one sprung axle, wherein the sensor includes a compression travel device configured to determine a compression travel of the at least one sprung axle.

5. The foot scooter as recited in claim 1, wherein the motor is an electric motor.

6. The foot scooter as recited in claim 1, wherein a mass of the person is inferred from the force detected at a point in time at which no push-off is present, and the motor is controlled as a function of the mass of the person and configured to be adapted to the mass of the person.

7. A method for operating a foot scooter for the locomotion of a person, the foot scooter including a footboard having a deck for accommodating the person, the foot scooter being propellable by a push-off motion by the person, the method comprising:
detecting, via a detector, a force exerted by the person on the deck, the detector including a sensor configured to measure a force resulting from the push-off motion of the person on the deck;
determining, via an evaluator, based on the sensor measurement, whether a push-off state is present; and
controlling a motor present on the foot scooter for supporting the propulsion of the foot scooter as a function of the determined force,
wherein a mass of the person is inferred from the force detected at a point in time at which no push-off is present, and the motor is controlled as a function of the mass of the person and configured to be adapted to the mass of the person.

8. The method as recited in claim 7, wherein an operation of the motor during time periods in which no push-off is present is carried out in such a way that a slowdown of the foot scooter is reduced after a push-off by the person.

9. The method as recited in claim 7, wherein an operation of the motor during time periods in which no push-off is present is carried out in such a way that a fluctuation in a speed induced by the push-off by the person is compensated for.

10. The method as recited in claim 7, wherein the motor is controlled by providing greater propulsion support to a higher mass of the person than a lower mass of the person.

* * * * *